(12) United States Patent
Yi et al.

(10) Patent No.: US 6,900,958 B1
(45) Date of Patent: May 31, 2005

(54) METHOD AND DISK DRIVE FOR IMPROVING HEAD POSITION ACCURACY DURING TRACK FOLLOWING THROUGH REAL-TIME IDENTIFICATION OF EXTERNAL VIBRATION AND MONITORING OF WRITE-UNSAFE OCCURRENCES

(75) Inventors: Li Yi, Berkeley, CA (US); Yanbin Song, Irvine, CA (US); David A. Spaulding, San Juan Capistrano, CA (US); Arafat M. Butt, Lake Forest, CA (US); Robert J. McNab, San Jose, CA (US); David D. Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 75 days.

(21) Appl. No.: 10/632,434

(22) Filed: Jul. 31, 2003

(51) Int. Cl.[7] .............................................. G11B 5/596
(52) U.S. Cl. ..................................... 360/77.02; 360/25
(58) Field of Search .......................... 360/77.02, 77.08, 360/78.06, 31, 60, 25, 67

(56) References Cited

U.S. PATENT DOCUMENTS

| | | | |
|---|---|---|---|
| 5,402,400 A | * | 3/1995 | Hamada et al. .......... 360/78.06 |
| 5,550,685 A | | 8/1996 | Drouin |
| 5,608,586 A | | 3/1997 | Dang et al. |
| 5,654,840 A | | 8/1997 | Sareen et al. |
| 5,663,847 A | | 9/1997 | Abramovitch |
| 5,774,299 A | | 6/1998 | Malang |
| 5,825,579 A | * | 10/1998 | Cheung et al. .......... 360/77.08 |
| 6,049,441 A | | 4/2000 | Ottesen |
| 6,204,988 B1 | * | 3/2001 | Codilian et al. .............. 360/75 |
| 6,249,393 B1 | * | 6/2001 | Billings et al. ............... 360/31 |
| 6,493,172 B1 | | 12/2002 | Hsin |
| 6,496,320 B1 | | 12/2002 | Liu |
| 6,693,764 B1 | * | 2/2004 | Sheh et al. .............. 360/77.08 |
| 6,714,371 B1 | * | 3/2004 | Codilian ...................... 360/60 |
| 6,735,033 B1 | * | 5/2004 | Codilian et al. .............. 360/60 |
| 6,795,262 B1 | * | 9/2004 | Codilian et al. .............. 360/60 |
| 2002/0034036 A1 | | 3/2002 | Sri-Jayantha et al. |

* cited by examiner

Primary Examiner—Sinh Tran
Assistant Examiner—Fred F. Tzeng
(74) Attorney, Agent, or Firm—Won Tae C. Kim, Esq.; Robroy R. Fawcett, Esq.

(57) ABSTRACT

A method is disclosed for improving head position accuracy in a disk drive during track following of concentric data storage tracks through real-time identification of external vibration and monitoring of write-unsafe (WUS) occurrences. In the method, after a seek operation to a predetermined data storage track, the track is followed using a servo control loop having a nominal gain and responsive to a position error signal (PES). After waiting a vibration detection delay period, occurrences of the PES exceeding a WUS limit are counted generating a WUS limit exception count. Also, a property of a variance is determined from spectral power values generated from the PES during track following. If the WUS limit exception count exceeds a first threshold, and if the property of the variance exceeds a second threshold, the nominal gain is increased to a vibration gain within a frequency band, to attenuate the effect of external vibration.

24 Claims, 5 Drawing Sheets

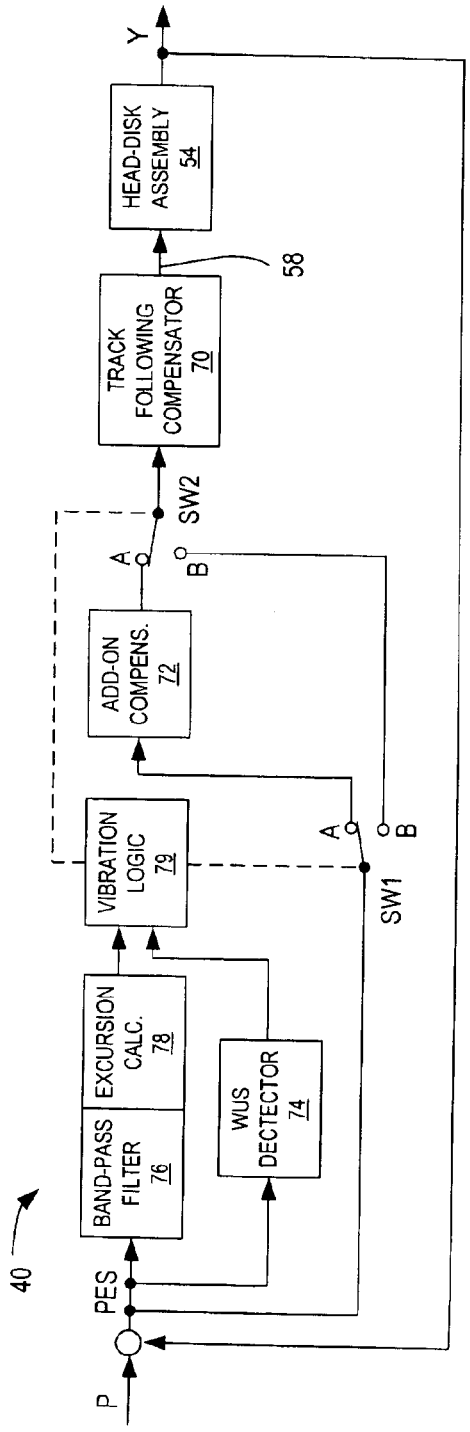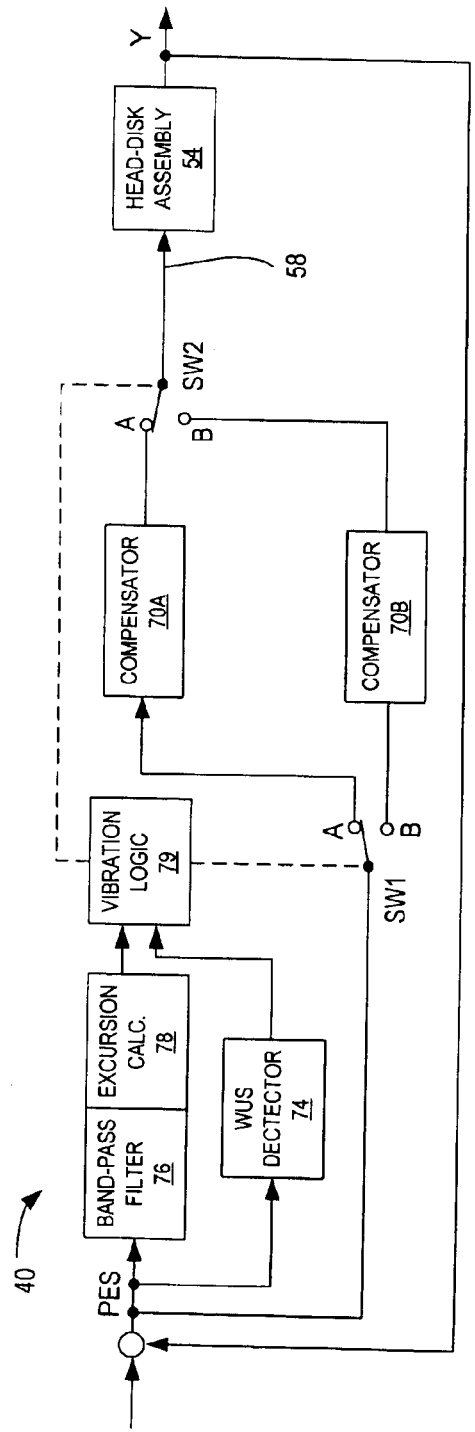

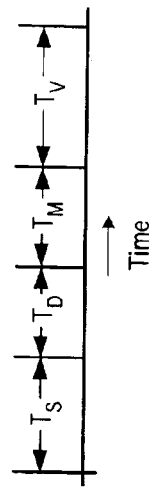
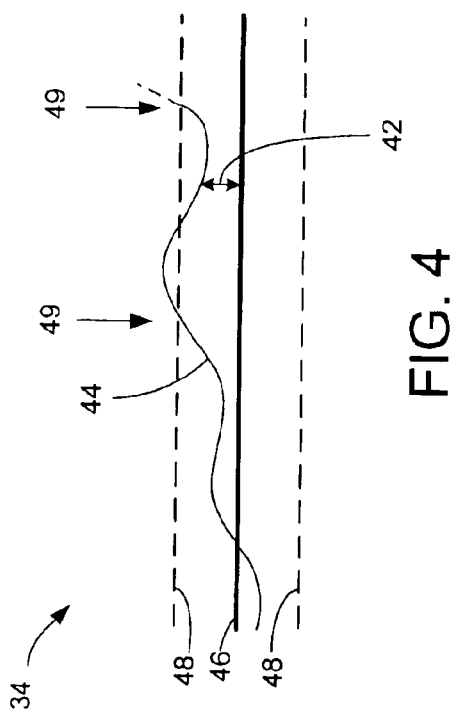
FIG. 4
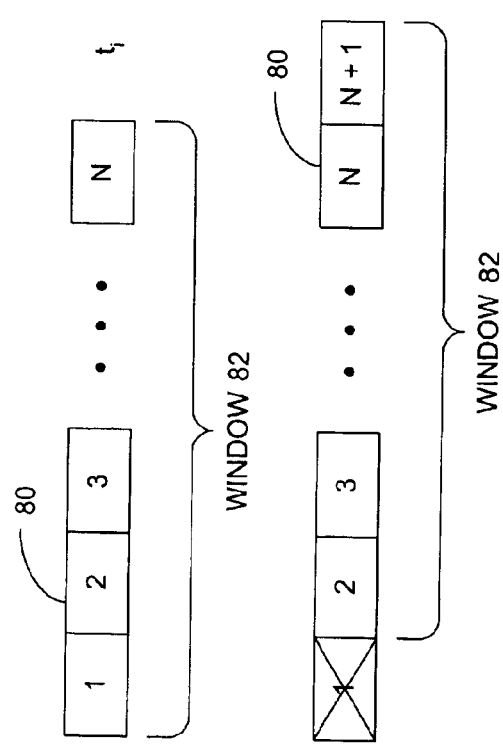
FIG. 5
FIG. 6A
FIG. 6B

METHOD AND DISK DRIVE FOR IMPROVING HEAD POSITION ACCURACY DURING TRACK FOLLOWING THROUGH REAL-TIME IDENTIFICATION OF EXTERNAL VIBRATION AND MONITORING OF WRITE-UNSAFE OCCURRENCES

BACKGROUND OF THE INVENTION

1. Field of the Invention

The present invention relates to disk drives, and more particularly, to a technique for improving head position accuracy during track following.

2. Description of the Prior Art and Related Information

In order to remain competitive, disk drive manufacturers must continually provide increased data storage capacity while rigidly controlling disk drive manufacturing cost. One key to increased storage capacity is increased track density, often expressed as tracks per inch or TPI. Market demand for increased storage capacity has pushed disk drive designers to increase the TPI of disk drives, thereby increasing the likelihood that an external vibration may undesirably force the disk drive's read/write head over an adjacent track during track following. A substantial reduction in a disk drive's operational performance in the presence of vibration may be a significant competitive disadvantage.

Accordingly, there exists a need for a method that enables a disk drive to minimize the effect of external vibration on head position accuracy during track following without unnecessarily increasing the disk drive's manufacturing cost.

SUMMARY OF THE INVENTION

The present invention may be embodied in a method for improving head position accuracy in a disk drive during track following of concentric data storage tracks on a rotating disk's storage surface through real-time identification of external vibration and monitoring of write-unsafe (WUS) occurrences. In the method, a seek operation to a predetermined data storage track is performed. After the seek operation, the predetermined data storage track is followed using a servo control loop that has a nominal gain and that is responsive to a position error signal (PES) generated during track following. After waiting a vibration detection delay period after the seek operation to the predetermined data storage track, occurrences of the PES exceeding a WUS limit are counted to generate a WUS limit exception count. Also, a property of a variance is determined from a predetermined number of temporally accumulated spectral power values, within a predetermined frequency band, generated from the PES during track following. If the WUS limit exception count exceeds a first threshold, and if the property of the variance exceeds a second threshold, the gain of the servo control loop, within the predetermined frequency band, is increased from the nominal gain to a vibration gain, to attenuate the effect of external vibration on the position of the head during track following.

In more detailed features of the invention, the gain of the servo control loop may be increased to the vibration gain for a predetermined vibration time period, after which the gain of the servo control loop may be returned to the nominal gain. The vibration time period may be between about 1 to 5 seconds, e.g., about 2 seconds. The gain of the servo control loop may remain at the vibration gain during a read operation performed after a write operation. The gain of the servo control loop also may remain at the vibration gain after a subsequent seek operation. The vibration detection delay period may be between about one-half (½) and three-fourths (¾) of one disk rotation, e.g., about two-thirds (⅔) of one disk rotation.

In other more detailed features of the invention, a WUS limit exception may occur when the PES indicates that a read/write head deviates from a desired track position for the predetermined data storage track by more than a predetermined WUS limit during track following. The property of the variance of the accumulated spectral power values may be based on an excursion of the variance of the accumulated spectral power values from a baseline variance value determined with no external vibration present. The first threshold may comprise at least 20 WUS limit exceptions within about 120 position samples based on embedded servo sectors defining the predetermined data storage track. The predetermined frequency band may be between about 0 and 500 hertz (Hz).

BRIEF DESCRIPTION OF THE DRAWINGS

The accompanying drawings illustrate embodiments of the present invention and, together with the description, serve to explain the principles of the invention.

FIG. 3A is a block diagram of a first embodiment of a servo control loop, implemented by the disk drive of FIG. 2, for improving head position accuracy during track following using an add-on compensator.

FIG. 3B is a block diagram of a second embodiment of a servo control loop, implemented by the disk drive of FIG. 2, for improving head position accuracy during track following using a selectable compensator.

FIG. 4 is a schematic diagram of a data track showing a write unsafe (WUS) limit and exemplary WUS limit exceptions, according to the present invention.

FIG. 5 is a timing diagram showing a seek time, a vibration detection delay period, a vibration monitoring and detection period, and a vibration time period.

FIGS. 6A and 6B are schematic diagrams illustrating a moving window for calculating variances on position error signal samples.

DETAILED DESCRIPTION

Figure 1:
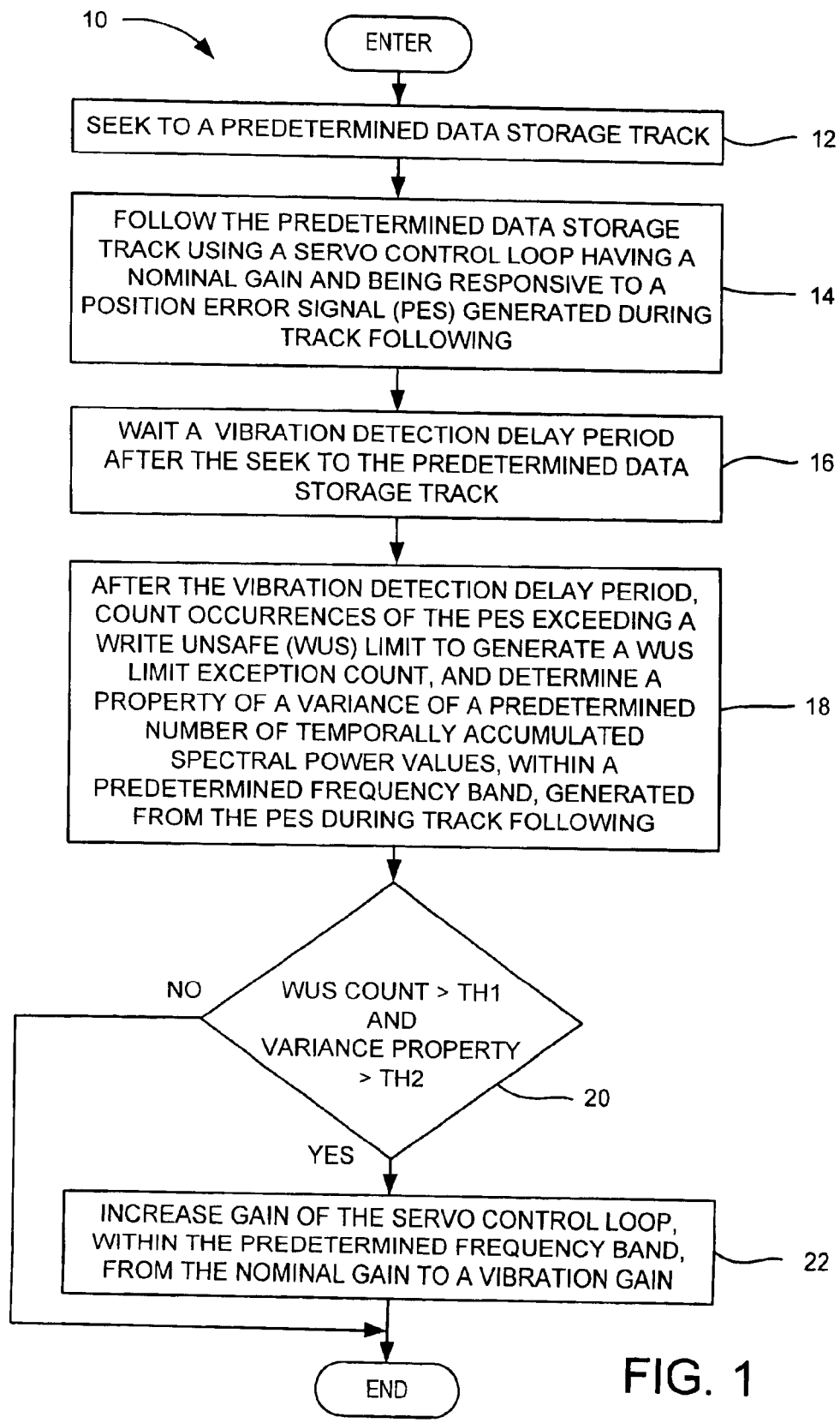
FIG. 1 is a flow diagram illustrating a method for improving head position accuracy in a disk drive during track following through real-time identification of external vibration and monitoring of write-unsafe occurrences, according to the present invention.
Figure 2:
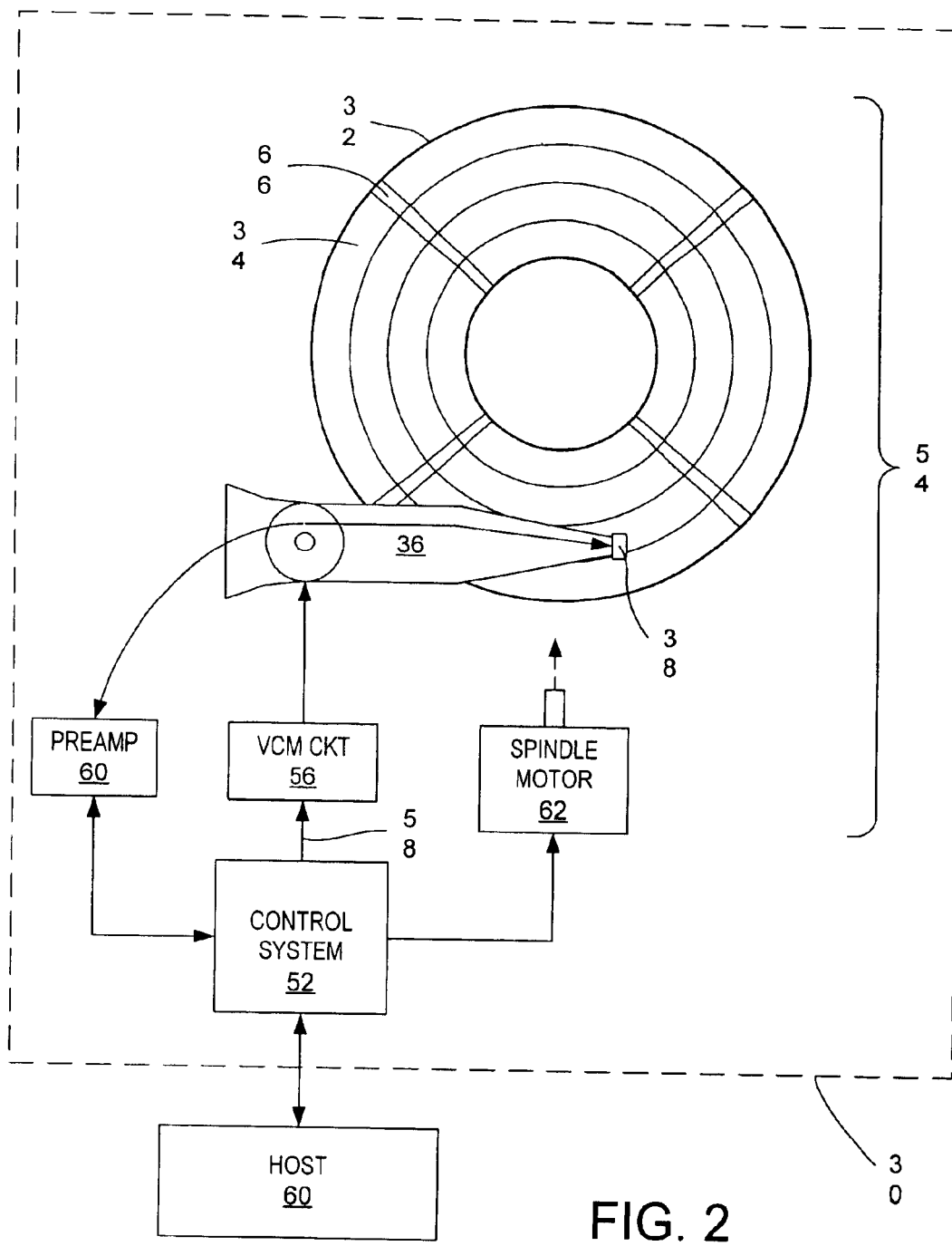
FIG. 2 is a block diagram of a disk drive having improved head position accuracy by implementing the method of FIG. 1.

With reference to FIGS. 1 to 5, the present invention may be embodied in a method 10 (FIG. 1) for improving head position accuracy in a disk drive 30 (FIG. 2) during track following through real-time identification of external vibration and monitoring of write-unsafe (WUS) occurrences. The disk drive has a rotating disk 32 formatted with a plurality of concentric data storage tracks 34, and has an actuator 36 for positioning a head 38 over the data storage tracks. In the method, a seek operation to a predetermined data storage track is performed (step 12). After the seek operation $T_S$ (FIG. 5), the predetermined data storage track is followed using a servo control loop 40 (FIGS. 3A, 3B and 7) that has a nominal gain and that is responsive to a position error signal (PES) 42 (FIG. 4) generated during track following based on a path 44 of the head 38 (step 14). After waiting a vibration detection delay period $T_D$ after the seek operation (step 16), occurrences of the PES exceeding a WUS limit 48 are counted (during a time period $T_M$) to generate a WUS limit exception count. Also, a property of a variance is determined from a predetermined number of temporally accumulated spectral power values, within a predetermined frequency band, generated from the PES during track following (step 18). If the WUS limit exception count exceeds a first threshold TH1, and if the property of the variance exceeds a second threshold TH2 (step 20), the gain of the servo control loop 40, within the predetermined frequency band, is increased from the nominal gain to a vibration gain, to attenuate the effect of external vibration on the position of the head 38 during track following (step 22).

Advantageously, the gain of the servo control loop 40 may be increased to the vibration gain for a predetermined vibration time period $T_V$, after which the gain of the servo control loop is returned to the nominal gain. The vibration time period may be between about 1 to 5 seconds, e.g., about 2 seconds. The gain of the servo control loop may remain at the vibration gain during a read operation performed after a write operation. The gain of the servo control loop also may remain at the vibration gain after a subsequent seek operation. The vibration detection delay period TD may be between about one-half (½) and three-fourths (¾) of one disk rotation, e.g., about two-thirds (⅔) of one disk rotation.

Additionally, a WUS limit exception may occur when the PES 42 indicates that a read/write head 38 deviates from a desired track position 46 for the predetermined data storage track 34 by more than a predetermined WUS limit 48 during track following. The property of the variance of the accumulated spectral power values may be based on an excursion of the variance of the accumulated spectral power values from a baseline variance value determined with no external vibration present. The first threshold may comprise at least 20 WUS limit exceptions 49 within about 120 position samples based on embedded servo sectors defining the predetermined data storage track.

The disk drive 30 generally comprises a disk control system 52 and a head disk assembly (HDA) 54. The HDA includes the magnetic disk 32 having the plurality of concentric data tracks 34 recorded thereon, the head 38 for writing user data to or reading user data from a selected one of the data tracks in response to host command, and the actuator 36 for positioning the head over the selected track. The head 38 in present disk drives comprises a giant magnetoresistive (GMR) read element and thin film inductive write element. The actuator is typically implemented as a voice coil motor (VCM) circuit 56 which rotates an actuator arm about a pivot in order to position the head radially over the disk in response to control signals 58 from the disk control system. The HDA 54 also includes a preamplifier 60, and a spindle motor 62 for rotating the disk. The head communicates with the disk control system 52 via the preamplifier. The disk control system also includes circuitry and processors that provide an intelligent disk control system interface between a host 64 and the HDA for execution of read and write commands. The control system may have, for example, an internal microprocessor and nonvolatile memory. Program code for implementing the techniques of the invention may be stored in the nonvolatile memory and transferred to volatile random access memory (RAM) for execution by the microprocessor.

The disk control system 52 implements the servo control loop 40 which causes the head 38 to follow a desired path (or centerline) 46 of the selected track 34 in an operation generally referred to as "track following." During track following, the path 44 of the head wanders about the desired track path 46. Typically, the disk control system attempts to limit the head wander to within a predetermined range defined by a "Track Misregistration" (TMR) budget.

A representative servo control loop 40 is shown in FIG. 3A. The servo control loop may be implemented using a digital microprocessor and, accordingly, the signals described herein may represent digital samples. A track 34 is selected for track following by applying the reference head position value P corresponding to the selected track at the input of the servo control loop. The position error signal PES is generated based on the difference between the reference head position value P and the actual head position signal Y. The actual head position signal Y is measured as the head 38 passes over a servo sector 66 of the selected track. Nominally, a track following compensator 70 processes the PES and generates the control signal 58 for application to the HDA 54.

External vibration or similar mechanical disturbance acting on the HDA 54 may force the head 38 away from the desired track path 46. If the external vibration is sufficiently continuous and periodic, the resulting force on the HDA may result in a component of the PES that is similarly continuous and periodic. The technique of the present invention attempts to identify the external vibration induced component of the PES and attenuate the effect of the external vibration using, for example, an add-on compensator 72.

In a first embodiment of the servo control loop 40 (FIG. 3A), a vibration condition is detected using a WUS detector 74, a band pass filter 76, an excursion calculator 78, and vibration logic 79. The WUS detector compares the PES 42 with the WUS limit 48 and counts occurrences of WUS limit exceptions. The band-pass filter has a predetermined frequency band and generates spectral power values 80 from the PES. The spectral power values are accumulated over a time window 82 that includes temporally accumulated spectral power values 1 through N (e.g., N=104), as shown in FIG. 6A. A variance of the spectral power values is calculated for the values falling within the window. The variance is a statistical mean of the squares of variations from the mean of a distribution of the spectral power values falling within the window. The calculated variance is compared with a baseline variance value to generate an excursion. The excursion is basically a difference between the calculated variance value and the baseline variance value. The baseline variance value may be determined, with no external vibration present, as a mean of variances over several distinct windows (e.g., 10 windows of 104 values). After the calculation of a next spectral power value 80 by the band-pass filter, the window 82 is repositioned by one value to now includes spectral power values 2 through N+1, as shown in FIG. 6B. The variance is calculated for the spectral power values in the repositioned window and compared with the baseline variance value to provide an updated excursion, which is compared with the second threshold TH2. The use of the variance over the time window 82 of spectral power values advantageously prevents false alarms that may unnecessarily engage the add-on compensator which may impact the disk drive's performance. Combining the variance-based excursion with the WUS limit exception count provides a reliable detector. The thresholds, TH1 and TH2, in the vibration logic may be empirically set to minimize false alarms while providing reliable vibration detection.

If both thresholds are met, the vibration logic 79 changes the state of the switches, SW1 and SW2, from position B to position A, as shown in FIG. 3A, thus engaging the add-on compensator 72. The add-on compensator attempts to increase the gain of the servo control loop 40 within the frequency band that corresponds to the spectral power distribution of the external vibration. The add-on compensator may remain engaged throughout the duration of the vibration time period $T_V$. After the vibration time period, the calculated variances are again accumulated and the excursion calculated.

If both thresholds are not met during the detection and monitoring time period $T_M$, then the WUS limit exception count is reset and the time period $T_M$ is restarted.

Although not explicitly shown, several band-pass filters 76, covering several different frequency bands, may operate simultaneously on the PES. If an excursion based on one or more of the frequency bands exceeds the second threshold TH2, and the WUS limit exception count threshold TH1 is met, then the vibration logic 79 may advantageously engage the add-on compensator 72. The number of band-pass filters and corresponding vibration detectors in operation may be based on the desired resolution and available computational power.

The spectral power of a representative external vibration experienced by a disk drive 30 generally falls within a frequency range of about 0 to 500 hertz (Hz). Accordingly, the band-pass filter 76 may have a center frequency of about 300 Hz. Alternatively, the band-pass filter may have a center frequency of about 500 Hz. If multiple frequency ranges are monitored, one range may be centered at 300 Hz and another range may be centered at about 500 Hz.

In a second embodiment of the servo control loop 40 (FIG. 3B), the gain of the servo control loop may be increased by switching between a first compensator 70A and a second compensator 70B. The first compensator may be a nominal gain compensator and the second compensator may be a higher vibration gain compensator. When both thresholds, TH1 and TH2, are met, the vibration logic 79 changes the state of the switches, SW 1 and SW2, from position A to position B, to switch from use of the first compensator 70A to use of the second compensator 70B, thus increasing the gain of the servo control loop.

Figure 7:
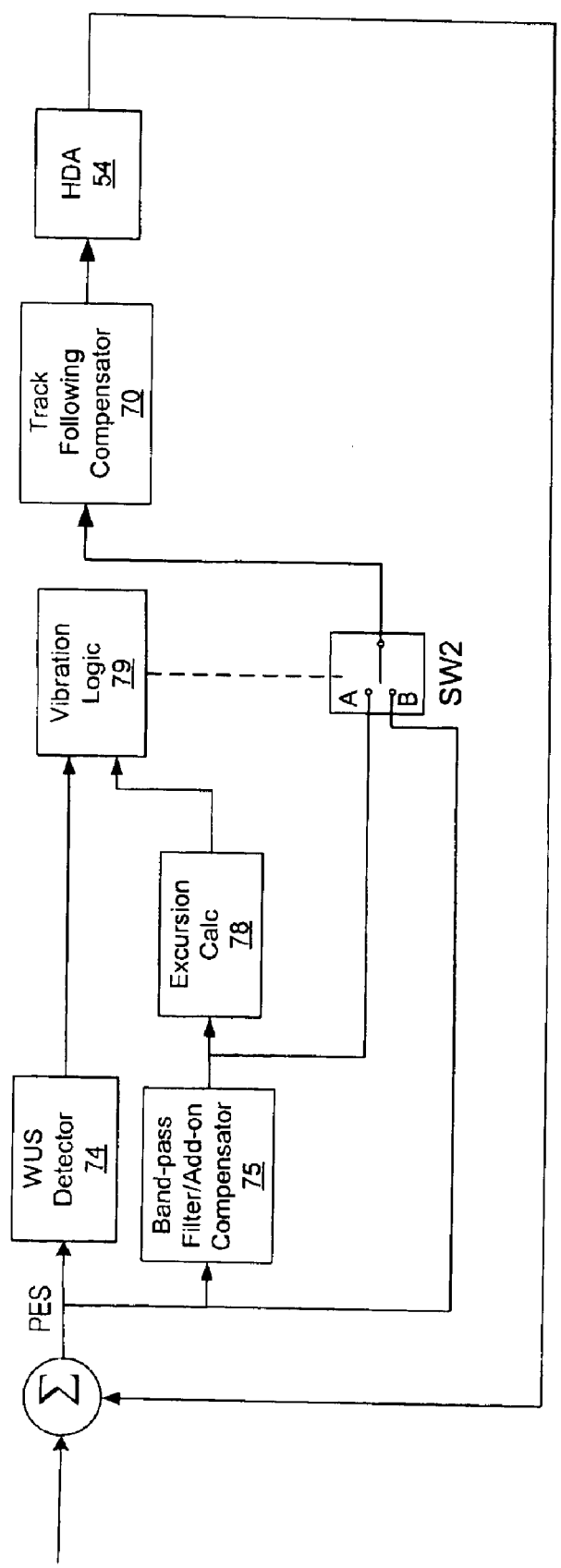
FIG. 7 is a block diagram of a third embodiment of a servo control loop, implemented by the disk drive of FIG. 2, for improving head position accuracy during track following using a band-pass filter/add-on compensator.

With reference to FIG. 7, for a given frequency band, the band-pass filter may be used both for the vibration detection and the add-on compensation as shown by the band-pass filter/add-on compensator 75. Because the band-pass filter may be implemented by firmware in the control system 52, the band-pass filter firmware code and parameters may be used in both the detection state and the vibration state by appropriately directing the filter's output (and input, if necessary).

What is claimed is:

1. A method for improving head position accuracy in a disk drive during track following of concentric data storage tracks on a rotating disk's storage surface through real-time identification of external vibration, the method comprising the steps, of:
   seeking to a predetermined data storage track;
   following the predetermined data storage track using a servo control loop having a nominal gain and being responsive to a position error signal (PES) generated during track following;
   waiting a vibration detection delay period after the seek to the predetermined data storage track;
   after the vibration detection delay period, counting occurrences of the PES exceeding a write unsafe (WUS) limit to generate a WUS limit exception count, and determining a property of a variance of a predetermined number of temporally accumulated spectral power values, within a predetermined frequency band, generated from the PES during track following; and
   increasing the gain of the servo control loop, within the predetermined frequency band, from the nominal gain to a vibration gain, if the WUS limit exception count exceeds a first threshold and if the property of the variance exceeds a second threshold, to attenuate the effect of external vibration on the position of the head during track following.

2. A method for improving head position accuracy as defined in claim 1, wherein the gain of the servo control loop is increased to the vibration gain for a predetermined vibration time period, after which the gain of the servo control loop is returned to the nominal gain.

3. A method for improving head position accuracy as defined in claim 2, wherein the vibration time period is between about 1 to 5 seconds.

4. A method for improving head position accuracy as defined in claim 3, wherein the vibration time period is about 2 seconds.

5. A method for improving head position accuracy as defined in claim 1, wherein the gain of the servo control loop remains at the vibration gain during a read operation performed after a write operation.

6. A method for improving head position accuracy as defined in claim 1, wherein the gain of the servo control loop remains at the vibration gain after a subsequent seek operation.

7. A method for improving head position accuracy as defined in claim 1, wherein the vibration detection delay period is between about one-half (½) and three-fourths (¾) of one disk rotation.

8. A method for improving head position accuracy as defined in claim 1, wherein the vibration detection delay period is about two-thirds (⅔) of one disk rotation.

9. A method for improving head position accuracy as defined in claim 1, wherein a WUS limit exception occurs when the PES indicates that a read/write head deviates from a desired track position for the predetermined data storage track by more than a predetermined WUS limit during track following.

10. A method for improving head position accuracy as defined in claim 1, wherein the property of the variance of the accumulated spectral power values is based on an excursion of the variance of the accumulated spectral power values from a baseline variance value determined with no external vibration present.

11. A method for improving head position accuracy as defined in claim 1, wherein the first threshold comprises at least 20 WUS limit exceptions within about 120 position samples based on embedded servo sectors defining the predetermined data storage track.

12. A method for improving head position accuracy as defined in claim 1, wherein the predetermined frequency is between about 0 and 500 hertz.

13. A disk drive having improved head position accuracy during track following of concentric data storage tracks on a rotating disk's storage surface through real-time identification of external vibration, comprising:
   means for seeking to a predetermined data storage track;
   means for following the predetermined data storage track using a servo control loop having a nominal gain and being responsive to a position error signal (PES) generated during track following;

means for waiting a vibration detection delay period after the seek to the predetermined data storage track;

means for counting occurrences of the PES exceeding a write unsafe (WUS) limit to generate a WUS limit exception count, and for determining a property of a variance of a predetermined number of temporally accumulated spectral power values, within a predetermined frequency band, generated from the PES during track following, after the vibration detection delay period; and means for increasing the gain of the servo control loop, within the predetermined frequency band, from the nominal gain to a vibration gain, if the WUS limit exception count exceeds a first threshold and if the property of the variance exceeds a second threshold, to attenuate the effect of external vibration on the position of the head during track following.

14. A disk drive having improved head position accuracy as defined in claim 13, wherein the means for increasing the gain of the servo control loop increases the servo control loop's gain to the vibration gain for a predetermined vibration time period, after which the gain of the servo control loop is returned to the nominal gain.

15. A disk drive having improved head position accuracy as defined in claim 14, wherein the vibration time period is between about 1 to 5 seconds.

16. A disk drive having improved head position accuracy as defined in claim 15, wherein the vibration time period is about 2 seconds.

17. A disk drive having improved head position accuracy as defined in claim 13, wherein means for increasing the gain of the servo control loop maintains the servo control loop's gain at the vibration gain during a read operation performed after a write operation.

18. A disk drive having improved head position accuracy as defined in claim 13, wherein means for increasing the gain of the servo control loop maintains the servo control loop's gain at the vibration gain after a subsequent seek operation.

19. A disk drive having improved head position accuracy as defined in claim 13, wherein the vibration detection delay period is between about one-half ($\frac{1}{2}$) and three-fourths ($\frac{3}{4}$) of one disk rotation.

20. A disk drive having improved head position accuracy as defined in claim 13, wherein the vibration detection delay period is about two-thirds ($\frac{2}{3}$) of one disk rotation.

21. A disk drive having improved head position accuracy as defined in claim 13, wherein a WUS limit exception occurs when the PES indicates that a read/write head deviates from a desired track position for the predetermined data storage track by more than a predetermined WUS limit during track following.

22. A disk drive having improved head position accuracy as defined in claim 13, wherein the property of the variance of the accumulated spectral power values is based on an excursion of the variance of the accumulated spectral power values from a baseline variance value determined with no external vibration present.

23. A disk drive having improved head position accuracy as defined in claim 13, wherein the first threshold comprises at least 20 WUS limit exceptions within about 120 position samples based on embedded servo sectors defining the predetermined data storage track.

24. A disk drive having improved head position accuracy as defined in claim 13, wherein the predetermined frequency is between about 0 and 500 hertz.

* * * * *